(12) United States Patent
Fox et al.

(10) Patent No.: US 8,149,833 B2
(45) Date of Patent: Apr. 3, 2012

(54) WIDEBAND CABLE DOWNSTREAM PROTOCOL

(75) Inventors: David B. Fox, Bolton, MA (US); John T. Chapman, Saratoga, CA (US); Alon S. Bernstein, Sunnyvale, CA (US); Albert A. Slane, Cottage Grove, WI (US)

(73) Assignee: Cisco Technology, Inc., San Jose, CA (US)

(*) Notice: Subject to any disclaimer, the term of this patent is extended or adjusted under 35 U.S.C. 154(b) by 747 days.

(21) Appl. No.: 11/137,606

(22) Filed: May 24, 2005

(65) Prior Publication Data

US 2005/0265392 A1   Dec. 1, 2005

Related U.S. Application Data

(60) Provisional application No. 60/574,506, filed on May 25, 2004, provisional application No. 60/574,876, filed on May 26, 2004, provisional application No. 60/582,732, filed on Jun. 22, 2004, provisional application No. 60/588,635, filed on Jul. 16, 2004, provisional application No. 60/590,509, filed on Jul. 23, 2004.

(51) Int. Cl.
*H04L 12/28* (2006.01)
*H04J 3/24* (2006.01)
(52) U.S. Cl. .................... 370/392; 370/394; 370/474
(58) Field of Classification Search .................. 370/392
See application file for complete search history.

(56) References Cited

U.S. PATENT DOCUMENTS

| | | |
|---|---|---|
| 4,977,593 A | 12/1990 | Ballance |
| 5,153,763 A | 10/1992 | Pidgeon |
| 5,457,678 A | 10/1995 | Goeldner |
| 5,604,735 A | 2/1997 | Levinson et al. |
| 5,724,510 A | 3/1998 | Arndt et al. |
| 5,784,597 A | 7/1998 | Chiu et al. |
| 5,805,602 A | 9/1998 | Cloutier et al. |
| 5,918,019 A | 6/1999 | Valencia |
| 5,931,954 A | 8/1999 | Hoshina et al. |
| 5,933,420 A | 8/1999 | Jaszewski et al. |
| 5,963,557 A | 10/1999 | Eng |
| 6,023,769 A | 2/2000 | Gonzalez |
| 6,078,595 A | 6/2000 | Jones et al. |
| 6,101,180 A | 8/2000 | Donahue et al. |
| 6,137,793 A | 10/2000 | Gorman et al. |
| 6,233,235 B1 | 5/2001 | Burke et al. |

(Continued)

FOREIGN PATENT DOCUMENTS

WO          00/72509          11/2000

(Continued)

OTHER PUBLICATIONS

Postel, J., "User Datagram Protocol", RFC 768, Aug. 28, 1980, 3 pgs.

(Continued)

*Primary Examiner* — John Blanton
(74) *Attorney, Agent, or Firm* — Stolowitz Ford Cowger LLP

(57) ABSTRACT

A network device has a communications port to provide communication with a data network and a cable port to provide communication with a cable network across multiple channels. The network device also has a processor to receive data from the data network, format the data into packets for transmission across the multiple channels and provide an identifier to allow the packets to be reconstructed.

23 Claims, 4 Drawing Sheets

U.S. PATENT DOCUMENTS

| | | | |
|---|---|---|---|
| 6,233,246 B1 | 5/2001 | Hareski et al. | |
| 6,275,990 B1 | 8/2001 | Dapper et al. | |
| 6,331,987 B1 | 12/2001 | Beser | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,490,727 B1 | 12/2002 | Nazarathy et al. | |
| 6,510,162 B1 | 1/2003 | Fijolek et al. | |
| 6,516,345 B1 | 2/2003 | Kracht | |
| 6,546,017 B1 | 4/2003 | Khaunte | |
| 6,556,591 B2 | 4/2003 | Bernath et al. | |
| 6,640,248 B1 | 10/2003 | Jorgensen | |
| 6,693,878 B1 | 2/2004 | Daruwalla et al. | |
| 6,697,970 B1 | 2/2004 | Chisholm | |
| 6,698,022 B1 | 2/2004 | Wu | |
| 6,751,230 B1 | 6/2004 | Vogel et al. | |
| 6,763,019 B2 | 7/2004 | Mehta et al. | |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,807,193 B1 | 10/2004 | Beser | |
| 6,819,682 B1 | 11/2004 | Rabenko et al. | |
| 6,829,250 B2 | 12/2004 | Voit et al. | |
| 6,847,635 B1 | 1/2005 | Beser | |
| 6,853,680 B1 | 2/2005 | Nikolich | |
| 6,857,132 B1* | 2/2005 | Rakib et al. | 725/114 |
| 6,901,079 B1 | 5/2005 | Phadnis et al. | |
| 6,930,988 B2 | 8/2005 | Koodli et al. | |
| 6,950,399 B1 | 9/2005 | Bushmitch et al. | |
| 6,959,042 B1 | 10/2005 | Liu et al. | |
| 6,986,157 B1 | 1/2006 | Fijolek et al. | |
| 6,993,016 B1 | 1/2006 | Liva et al. | |
| 6,993,353 B2 | 1/2006 | Desai et al. | |
| 6,996,129 B2 | 2/2006 | Krause et al. | |
| 7,006,500 B1* | 2/2006 | Pedersen et al. | 370/394 |
| 7,007,296 B2 | 2/2006 | Rakib et al. | |
| 7,023,871 B2 | 4/2006 | Lind et al. | |
| 7,023,882 B2 | 4/2006 | Woodward, Jr. et al. | |
| 7,039,049 B1 | 5/2006 | Akgun et al. | |
| 7,050,419 B2 | 5/2006 | Azenkot et al. | |
| 7,065,779 B1 | 6/2006 | Crocker et al. | |
| 7,067,734 B2 | 6/2006 | Abe et al. | |
| 7,110,398 B2 | 9/2006 | Grand et al. | |
| 7,113,484 B1 | 9/2006 | Chapman et al. | |
| 7,116,643 B2 | 10/2006 | Huang et al. | |
| 7,117,526 B1 | 10/2006 | Short | |
| 7,139,923 B1 | 11/2006 | Chapman et al. | |
| 7,145,887 B1 | 12/2006 | Akgun et al. | |
| 7,149,223 B2 | 12/2006 | Liva et al. | |
| 7,161,945 B1 | 1/2007 | Cummings | |
| 7,164,690 B2 | 1/2007 | Limb et al. | |
| 7,197,052 B1 | 3/2007 | Crocker | |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1 | 10/2007 | Kumar | |
| 7,359,332 B2 | 4/2008 | Kolze et al. | |
| 7,363,629 B2 | 4/2008 | Springer et al. | |
| 7,467,227 B1 | 12/2008 | Nguyen et al. | |
| 7,490,345 B2 | 2/2009 | Rakib et al. | |
| 7,492,763 B1 | 2/2009 | Alexander, Jr. | |
| 7,548,558 B2 | 6/2009 | Rakib et al. | |
| 7,613,209 B1* | 11/2009 | Nguyen et al. | 370/474 |
| 7,646,786 B2 | 1/2010 | Droms et al. | |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0023174 A1 | 2/2002 | Garrett et al. | |
| 2002/0052927 A1* | 5/2002 | Park | 709/217 |
| 2002/0062450 A1 | 5/2002 | Carlson et al. | |
| 2002/0067721 A1* | 6/2002 | Kye | 370/389 |
| 2002/0073432 A1 | 6/2002 | Kolze | |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0097733 A1 | 7/2002 | Yamamoto | |
| 2002/0131403 A1 | 9/2002 | Desai et al. | |
| 2002/0131426 A1* | 9/2002 | Amit et al. | 370/401 |
| 2002/0133618 A1 | 9/2002 | Desai et al. | |
| 2002/0136203 A1 | 9/2002 | Liva et al. | |
| 2002/0141585 A1 | 10/2002 | Carr | |
| 2002/0144284 A1 | 10/2002 | Burroughs et al. | |
| 2002/0146010 A1 | 10/2002 | Shenoi et al. | |
| 2002/0147978 A1 | 10/2002 | Dolgonos et al. | |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0014762 A1 | 1/2003 | Conover et al. | |
| 2003/0026230 A1 | 2/2003 | Ibanez et al. | |
| 2003/0043802 A1* | 3/2003 | Yazaki et al. | 370/389 |
| 2003/0058794 A1 | 3/2003 | Pantelias et al. | |
| 2003/0061415 A1 | 3/2003 | Horton et al. | |
| 2003/0066087 A1 | 4/2003 | Sawyer et al. | |
| 2003/0067944 A1 | 4/2003 | Sala et al. | |
| 2003/0101463 A1 | 5/2003 | Greene et al. | |
| 2003/0140131 A1 | 7/2003 | Chandrashekhar et al. | |
| 2003/0163341 A1 | 8/2003 | Banerjee et al. | |
| 2003/0214943 A1 | 11/2003 | Engstrom et al. | |
| 2003/0214982 A1 | 11/2003 | Lorek et al. | |
| 2004/0039466 A1 | 2/2004 | Lilly et al. | |
| 2004/0045037 A1 | 3/2004 | Cummings et al. | |
| 2004/0071148 A1 | 4/2004 | Ozaki et al. | |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0160945 A1 | 8/2004 | Dong et al. | |
| 2004/0163129 A1* | 8/2004 | Chapman et al. | 725/126 |
| 2004/0181800 A1 | 9/2004 | Rakib et al. | |
| 2004/0244043 A1* | 12/2004 | Lind et al. | 725/111 |
| 2004/0248530 A1 | 12/2004 | Rakib et al. | |
| 2005/0010958 A1 | 1/2005 | Rakib et al. | |
| 2005/0018697 A1 | 1/2005 | Enns et al. | |
| 2005/0078699 A1* | 4/2005 | Cummings | 370/437 |
| 2005/0122976 A1 | 6/2005 | Poli et al. | |
| 2005/0138669 A1 | 6/2005 | Baran | |
| 2005/0198684 A1 | 9/2005 | Stone et al. | |
| 2005/0201399 A1* | 9/2005 | Woodward et al. | 370/412 |
| 2005/0220126 A1 | 10/2005 | Gervais et al. | |
| 2005/0226257 A1 | 10/2005 | Mirzabegian et al. | |
| 2005/0232294 A1 | 10/2005 | Quigley et al. | |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |
| 2005/0265397 A1 | 12/2005 | Chapman et al. | |
| 2005/0265398 A1 | 12/2005 | Chapman et al. | |
| 2005/0289623 A1 | 12/2005 | Midani et al. | |
| 2006/0002294 A1 | 1/2006 | Chapman et al. | |
| 2006/0098669 A1 | 5/2006 | Enns et al. | |
| 2006/0126660 A1 | 6/2006 | Denney et al. | |
| 2006/0159100 A1 | 7/2006 | Droms et al. | |
| 2006/0168612 A1 | 7/2006 | Chapman et al. | |
| 2007/0274345 A1 | 11/2007 | Taylor et al. | |
| 2008/0037545 A1 | 2/2008 | Lansing et al. | |

FOREIGN PATENT DOCUMENTS

| | | |
|---|---|---|
| WO | 0072509 | 11/2000 |
| WO | 0242882 | 5/2002 |
| WO | 2004006503 | 1/2004 |
| WO | 2005117310 | 12/2005 |
| WO | 2005117358 | 12/2005 |

OTHER PUBLICATIONS

Postel, Jon, Editor, "DARPA Internet Program Protocol Specification", RFC 791, Sep. 1981, 45 pages.

Deering, S., "Host Extensions for IP Multicasting", RFC 1112, Aug. 1989.

Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Chapman, John T., "CMTS Remote PHY for a DOCSIS Network: DMPI Over IP Protocol Specification", RP-SP-DoIP-D1-040715B. doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16-2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Desai, et al., FastChannel: A Higher-Speed Cable Data Service, AT&T Labs-Research, pp. 1-13.
ADOBA, et al., Extensible Authentication Protocol (EAP), RFC 3748, Jun. 2004, pp. 1-64, Standards Track.
ITU-T Telecommunication Standardization Sector of ITU, Series J: Cable Networks and Transmission of Television, Sound Programme and Other Multimedia Signals, Interactive Systems for Digital Television Distribution, Recommendation J.122, Dec. 2002, 506 pages, International Telecommunication Union.
Ramakrishnan, Sangeeta, "Next Generation Edge—Realizing the vision of shared resources and bandwidth", date unknown, 16 pgs.
Cisco Systems, Inc., "Downstream External PHY Interface Specification", SP-DEPI-W2-041101A.DOC, EDCS-408926, date unknown.
Chapman, John T., "Remote PHY Technical White Paper Addendum," Downstream External PHY Interface Specification, Cisco Systems, Inc., EDCS-377253, date unknown.
Chapman, John T., "CMTS Remote PHY for a DOCSIS Network: DMPI Over IP Protocol Specification", RP-SP-DoIP-D1-040715B. doc, Cisco Systems, Inc., EDS-387722, date unknown.
U.S. Appl. No. 11/131,766, filed May 17, 2005, Chapman et al.
U.S. Appl. No. 11/135,777, filed May 23, 2005, Chapman et al.
U.S. Appl. No. 11/137,606, filed May 24, 2005, Chapman et al.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Ramakrishnan, Sangeeta, "Next Generation Edge—Realizing the vision of shared resources and bandwidth", date unknown, 16 pgs.
Cisco Systems, Inc., "Downstream External PHY Interface Specification", SP-DEPI-W2-041101A.DOC, EDCS-408926, date unknown.
Chapman, John T., "Remote PHY Technical White Paper Addendum," Downstream External PHY Interface Specification, Cisco Systems, Inc., EDCS-377253, date unknown.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, © 1999-2005.
Lau, J., et al., "Layer Two Tunneling Protocol—Version 3 (L2TPv3)," RFC 3931, Mar. 2005, 94 pages.
ETSI Data-Over-Cable Systems Part 2 Radio Frequency Interface Specifications, Jan. 2003, pp. 59-66, ES 201 488-2 V1.2.1.
Data Over Cable Service Interface Specification, Aug. 4, 1997.
Ethereal: Display Filter Reference: DOCSIS Upstream Channel Descriptor, Webarchivedate Apr. 27, 2004.
DOCSIS Set Top Gateway (DSG) interface specification, Feb. 28, 2002.
An Overview of Internet Protocols, Dann, Jan. 1998.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H. Tran, USPTO Office Action Paper No. 20080427, May 1, 2008, 10 pages.
U.S. Appl. No. 11/292,725, Bernstein et al., "Advanced Multicast Support for Cable", filed Dec. 1, 2005.
Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Hawa et al., "Quality of Service Scheduling in Cable and Broadband Wireless Access Systems," at http://www.ittc.ku.edu/publications/documents/Hawa2002_iwoos_paper.pdf, downloaded on Sep. 29, 2008.
Fellows et al., "DOCSIS Cable Modem Technology", IEEE Communication Magazine, vol. 39, Issue 3, Mar. 2001, pp. 202-209.

* cited by examiner

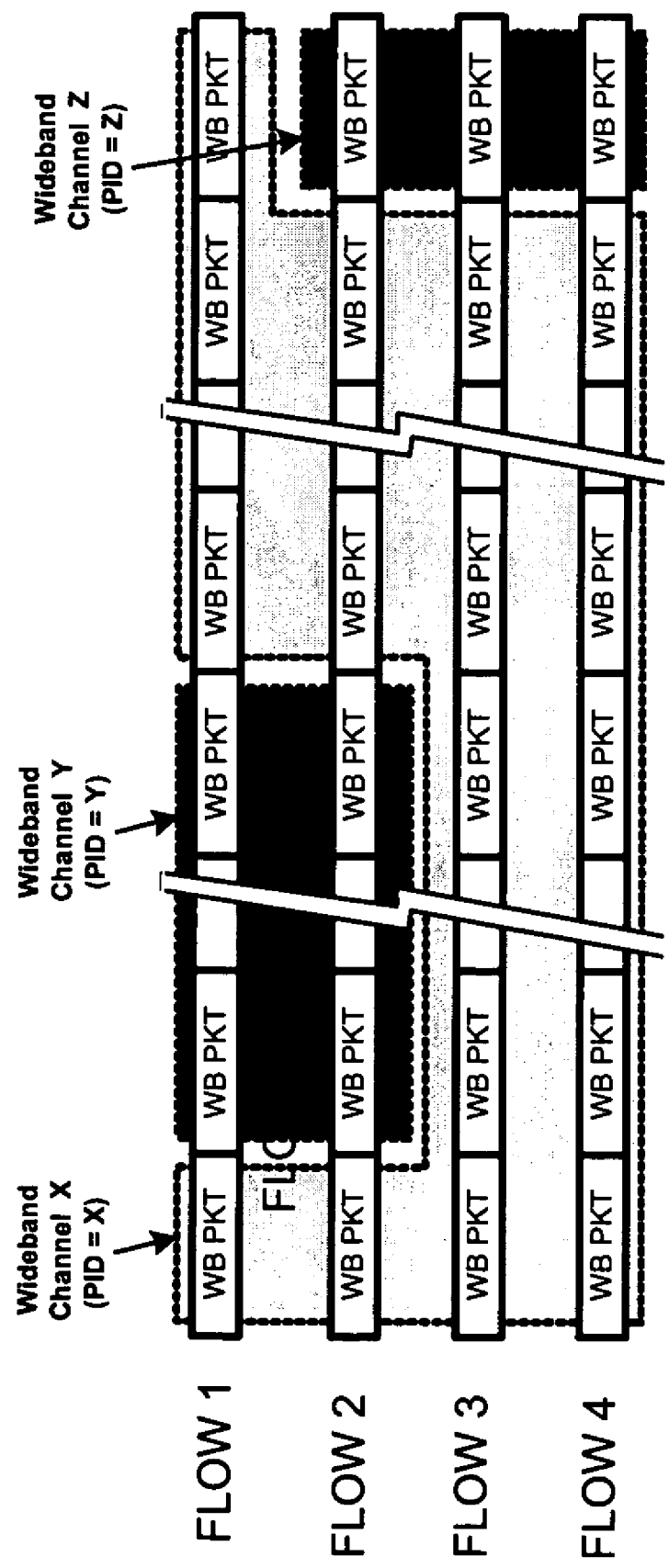

WIDEBAND CABLE DOWNSTREAM PROTOCOL

RELATED APPLICATIONS

This application is a continuation of, and claims priority to, the following provisional patent applications: 60/574,506, filed May 25, 2004; 60/574,876, filed May 26, 2004; 60/582,732, filed Jun. 22, 2004; 60/588,635, filed Jul. 16, 2004; and 60/590,509, filed Jul. 23, 2004.

BACKGROUND

Cable networks have been traditionally used to transmit video to users through their cable set-top boxes. The transmissions originate at a head-end, generally at a central location provided by the cable network provider. The transmission is received at the user end by a cable set-top box.

Using the infrastructure already established for the cable network, cable network providers began providing data services to users. With the use of a cable modem, users can transmit and send data across the network to other networks, such as packet-based networks like the Internet. The transmission travels upstream from the cable modem to the head-end, or a hub, where it is terminated by a cable modem termination server (CMTS). The CMTS then transmits the data out of the hub or head end to the packet network.

The CMTS also transmits the data from the packet network to the cable modem. The transmissions are generally across channels established within the spectrum available for transmissions. The channels are quadrature amplitude modulation channels (QAM), sometimes referred to as QAMs or narrow-band channels.

It is possible to create a higher bandwidth channel by grouping several QAMs together. Essentially, the higher bandwidth channel, sometimes referred to as a wideband or bonded channel, is an overlay on the narrow-band QAMs. This allows the existing narrow-band infrastructure to be used for wideband transmissions. The data is transmitted in bundles across the QAMs. In order to implement this type of scheme, however, the downstream equipment needs a means to reconstruct the transmissions.

SUMMARY

One embodiment is a network device having a communications port to provide communication with a data network and a cable port to provide communication with a cable network across multiple channels. The network device also has a processor to receive data from the data network, format the data into packets for transmission across the multiple channels and provide an identifier to allow the packets to be reconstructed.

BRIEF DESCRIPTION OF THE DRAWINGS

Embodiments of the invention may be best understood by reading the disclosure with reference to the drawings, wherein:

FIG. 8 shows an embodiment of multiplexed wideband downstream channels.

DETAILED DESCRIPTION OF THE EMBODIMENTS

Figure 1:
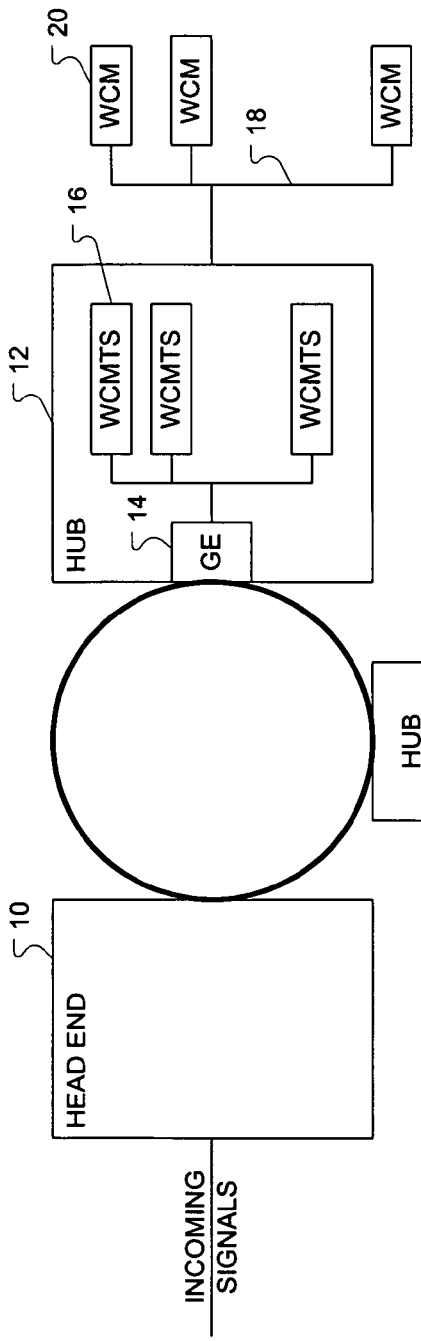
FIG. 1 shows an embodiment of a wideband cable network.

FIG. 1 show an example of a cable network topology. In a cable network, the head end 10 where all incoming signals are received or generated and typically frequency-division multiplexed (FDM) for 'downstream' transmission. Generally, the flow from the head end through any hubs 12 to the customer cable modems such as 20 is referred to as being downstream. Traffic flowing from the customer cable modems through any hubs back towards the head end is referred to as upstream.

The head end typically receives the incoming signals via high-speed, high-bandwidth connections, such as through a satellite link or a fiber-optic network. As the fiber-optic networks are generally located in larger metropolitan areas, these are sometimes referred to as 'metro' networks. The term 'metro' network has also come to mean the backbone network having high-speed, high-bandwidth links, whether they are fiber-optic or not. The head end may have several hubs attached to it, more than likely by fiber-optic cables. Between the hubs and the customers, the cabling is generally coaxial, or a hybrid fiber coaxial cable networks (HFC).

At the head end, or within a hub, a cable modem termination server 16 interfaces between the metro network and the cable modem. In one embodiment, a GigabitEthernet (GigE) 14 switch resides at the hub to switch traffic on the metro link to the various CMTSs used at the hub. The CMTS may also reside at the head end, if no hubs are used or if the system designer desires that the CMTS reside at the head end. An example of this is shown in FIG. 2.

Figure 2:
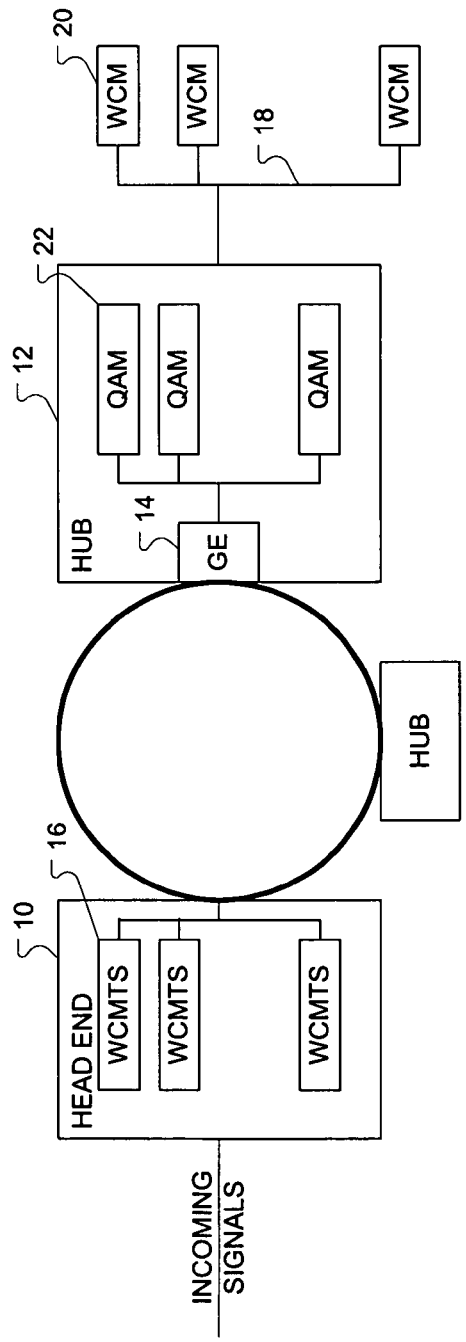
FIG. 2 shows an alternative embodiment of a wideband cable network.

In FIG. 2, the CMTS functionality 16 resides at the head end 10. The hub 12 has a GigE switch 14 and Quadrature Amplitude Modulators (QAM) 22. QAMs are used to transmit the data to the cable modems after it is 'converted' to the appropriate format for the cable modems. Currently, the appropriate format is that specified in the Date Over Cable System Interface Specification (DOCSIS). Converting the incoming data to the DOCSIS format is one of the functions performed by the CMTS. The QAMs may co-reside with the CMTSs, or may be separated from that functionality as is shown in FIG. 2.

In FIGS. 1 and 2, the CMTSs and cable modems are wideband (WCMTS and WCM). Typically, the traffic between the CMTSs and the cable modems travels in channels along the coax or HFC conduit 18. These channels are typically 6 or 8 MHz 'wide.' The QAMs take the cable data and modulate it into these channels for transmission across the coax or HFC conduit. These channels are sometimes referred to as 'narrowband' channels.

Figure 3:
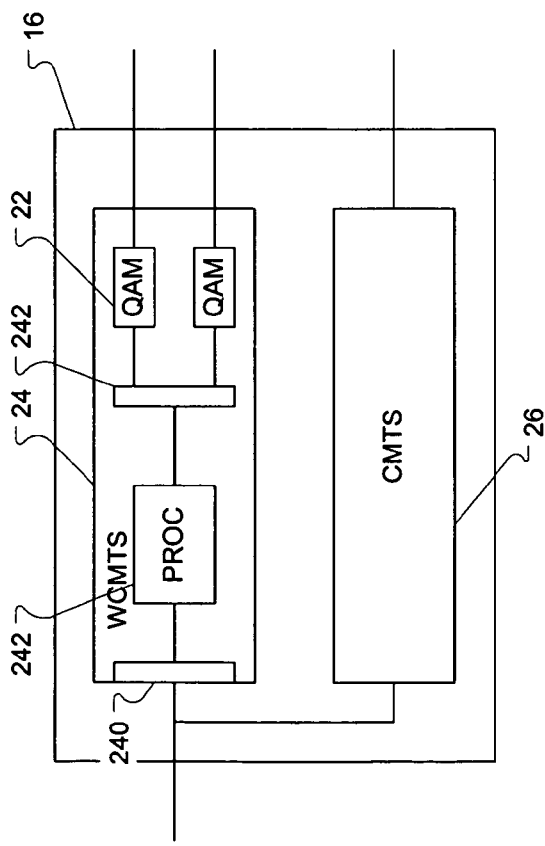
FIG. 3 shows an embodiment of a wideband cable modem termination server.

A more detailed view of a WCMTS is shown in FIG. 3. In this particular embodiment, the QAMs 22 are shown as residing with the CMTS. As mentioned above, this may not be the case. Also, The WCMTS 16 is actually comprised of a 'regular' or narrowband CMTS 26 and a wideband CMTS 24. This is not a necessary configuration, as the two different types of CMTSs may be in separate devices, but may also provide some convenience in allowing both narrowband and wideband data to be handled by the same box.

Figure 4:
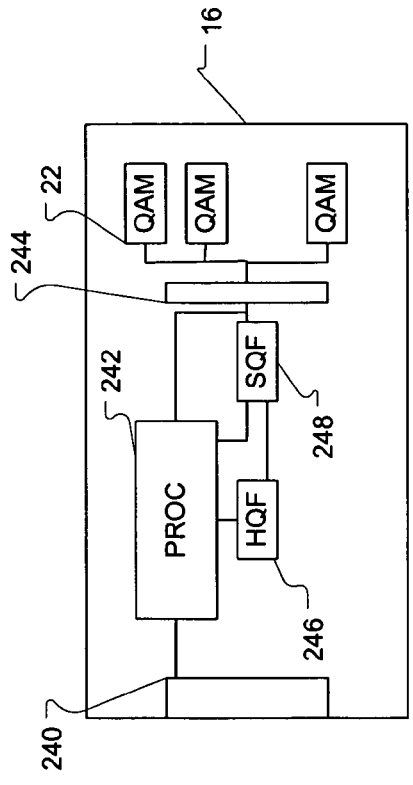
FIG. 4 shows an alternative embodiment of a wideband cable modem termination server.

The configuration shown as 16 in FIG. 3 is an embodiment of a wideband-narrowband CMTS. An embodiment of a configuration of a standalone wideband CMTS is shown in FIG. 4. The embodiment of FIG. 4 includes QAMs 22, but as mentioned above, this is one alternative embodiment. The wideband device will more than likely perform the same functions whether it is in a wideband-narrowband device or a standalone wideband CMTS, and will be discussed here with regard to FIG. 3.

The data is received from the GigE switch and sent to either the WCMTS or the CMTS depending upon the destination of the data. The WCTMS then receives the data through an interface compatible with the GigE data. In order to differentiate between the incoming and outgoing interfaces, the incoming interface or communications port will be referred to as communicating with the data network.

A processor 242 receives the data from the data network, such as Ethernet frames. Ethernet frames refer to the data received in a format compatible with the Institute of Electrical and Electronic Engineers standard 802.3. The frames are then 'converted' into DOCSIS packets and transmitted across the cable interface 244 to the QAMs 22.

A wideband CMTS uses several narrowband channels to transmit the data. A wideband channel is a collection of narrowband channels 'bonded' together, and may be referred to as 'channel bonding.' Referring to FIG. 5, it can be seen that the data for a wideband channel, shown as the vertical bars 38, is placed 'vertically' across several DOCSIS channels 30-36. This is in contrast to a narrowband channel that places data across one channel horizontally in time.

MPEG Sequencing

The conversion from the data network format, such as Ethernet frames, to cable format may be accomplished using MPEG packets. The MPEG (Moving Pictures Experts Group) standard calls for the data to be transmitted in transport streams (TS), each identified by a unique program identifier (PID). For wideband cable data, a predefined PID is used to identify wideband data. When the data is received, the PID alerts the receiving device that the data is wideband data.

With the data being transmitted across several different DOCSIS channels, which correspond to MPEG transport streams, the packets may be demodulated 'out of order,' and therefore require some sort of identifier to allow the cable modem to reconstruct the data in the appropriate sequence. In one embodiment of the invention, this is accomplished by a wideband header within the cable format header. In this particular embodiment the cable format header is an MPEG header.

Providing a sequence number embedded in a MPEG-TS packet allows the transmitting wideband frame, such as processor 242 of FIG. 3, maximum flexibility of creating MPEG-TS formats as it needs to. It uses the MPEG-TS pointer field to indicate if a new DOCSIS packet starts with the MPEG packet. It also keeps the reconstruction information for the receiving wideband framer in band for robustness.

Other alternative segmentations may also be used, such as at the bit, byte, MPEG-TS packet, or DOCSIS packet level. Because of the different segmentation availability, the data may be referred to as being formatted into transport segments, of which MPEG-TS is one embodiment. The MPEG-TS level is convenient because the bonding of the channels occurs at the transmission convergence layer. This allows the wideband protocol to be transparent to the traditional DOCSIS protocol. This transparency allows maximum re-use of existing DOCSIS environments.

In one embodiment, the wideband CMTS takes the data received across the data network interface 240 and converts it into transport segments. In one embodiment, this may entail receiving Ethernet frames and converting them into MPEG-TS packets. A sequence identifier is provided for each packet. The packets are then transmitted across the wideband channel.

Figures 5, 6, 7:
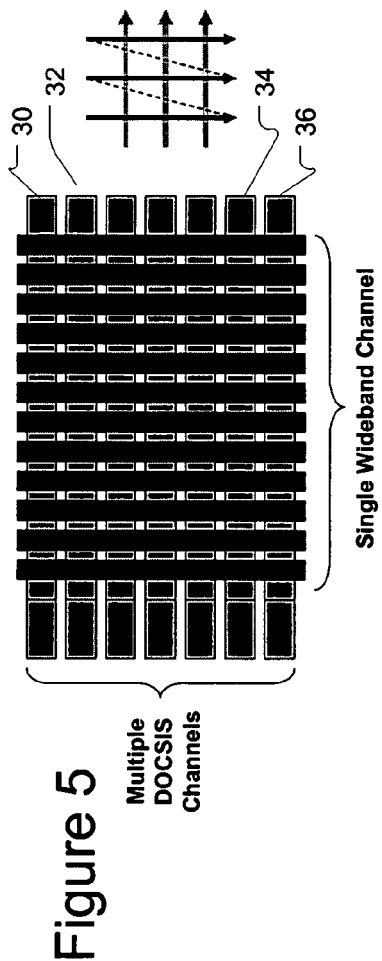
FIG. 5 shows a block diagram of a wideband downstream channel.
FIG. 6 shows a block diagram of a wideband downstream header.
FIG. 7 shows a block diagram of a multilink extended header.

In one embodiment, the sequence identifier is provided within a wideband header, which in turn is provided within an MPEG packet. An example of such a header is shown in FIG. 6. The MPEG-TS packet has two sections, a header and a payload. The MPEG-TS header is 4 bytes wide. The payload is further comprised of a DOCSIS payload, a pointer and a wideband header, to make up a 188-byte MPEG packet.

The pointer is 1 byte wide and is present when the Payload Unit Start Indicator (PUSI) bit is set to 1. This indicates that a new DOCSIS packet starts within the MPEG payload. If the PUSI bit is not set to 1, the pointer field is not present. The wideband header then resides at the fifth-sixth, or sixth-seventh, bytes of the MPEG packet, depending upon the PUSI bit.

A wideband control header has the most significant bit of the wideband header set to 1. A control message type is the remaining 7 bits of the first byte of the wideband header. The remaining portion of a wideband control packet header includes the control parameters. An important version of the control packet is a keep-alive control packet.

A wideband CMTS sends keep-alive control packets at periodic, programmed intervals to allow the receiving hardware to know that the channel is alive. These keep-alive packets are sent at or less than the maximum wideband keep-alive interval. Generally, keep-alive packets have a sequence number that monotonically increases from one event to the next.

During a keep-alive event, the WCMTS sends the keep-alive packet on every channel defined to belong to the wideband bundle. Keep-alives sent during the same event have the same keep-alive number. This will allow the skew between the member channels of the wideband channel to be measured. The receiving device then measures the network skew using the wideband control packets.

A wideband data header has the most significant bit of the wideband header set to 0. The data header is then comprised of a wideband sequence number that indicates the sequence of the MPEG packet within the wideband channel. Generally, these sequence numbers will monotonically increase for every subsequent MPEG packet within the bit stream, and wrap back to zero upon overflow. Twos compliment arithmetic may be used to determine if one sequence number is greater or less than another.

At the receiving end, the sequence numbers allow the packet to be reassembled in the correct order from all of the channels within the wideband channel. Because of channel skew between the member channels of the wideband channel, the packets may arrive out of sequence due to one channel being 'faster' than another. To make the MPEG-TS useful, the packets need to be reassembled in order. The sequence number allows this to happen.

In addition to sending data across multiple QAMs in a wideband channel, it is possible to multiplex wideband data with narrowband, or 'traditional DOCSIS' channels, due to the unique wideband PID. In addition, the wideband PIDs may be operator-assigned, so wideband channels can be multiplexed with narrowband channels and other wideband channels. An example of this is shown in FIG. 8. The wideband packets (WB PKT) would be MPEG packets and the flows would MPEG Transport Streams. In other embodiments, the packets may be of other formats.

Packet Bonding

Another embodiment of a control header that allows sequenced packets to be transmitted across wideband channels is packet bonding, or multilink. Multilinking involves transmitted packets across multiple links, similar to Multilink PPP. In the embodiments here, the links would be analogous to the narrowband channels within the wideband channels.

In a multilink packet bonding embodiment, the packets are transmitted across multiple narrowband channels that form the wideband channel similar to the MPEG transport stream transmissions. The multilink packets also have sequencing information in their headers to allow the packets to be resequenced into the correct order at the receiving end. One difference between the MPEG packets and 'generic' packets is that the MPEG packets contain portions of the incoming packets, while packet bonding involves entire incoming packets.

In the MPEG sequencing embodiments, the term 'wideband headers' refers to the wideband header using MPEG sequence numbers to allow the receiving end to reconstruct the MPEG streams. The transport segments in the MPEG embodiments are MPEG transport segments. In packet bonding, the multilink extended header provides the identifier and sequence numbers. The transport segments in the packet bonding embodiments will be referred to as multilink packets, even though those packets may actually be carried over MPEG frames.

Indeed, in one embodiment, the Ethernet frames may be received and translated into MPEG packets, but the payload of the MPEG packet is the entire packet received from the Ethernet frame. For this reason, the transport segments for packet bonding are referred to as multilink packets, to differentiate them from the MPEG transport segments that comprise partial packets.

An embodiment of an extended multilink control header is shown in FIG. 7. The EH_TYPE has a value of 7 for a downstream multilink packet and a value of 8 for an upstream multilink packet. If the length of the multilink extended header (EH_LEN) is 1 byte, this indicates that the packet is a multilink packet, but the sender has decided to include only the bonded channel identifier and not a sequence number. This could occur if the sender has determined that the sequence of packets does not matter, or that the packets have embedded sequence numbers. Further, by not using sequence numbers, the latency of the receive buffer is reduced in the event of missing packets.

If the length of the multilink extended header is 3 bytes, this indicates that the packet is a multilink packet with a sequence number. The sequence number is unique per Ethernet Destination MAC Address (MAC DA). This rule applies to any unicast, multicast or broadcast MAC packets carried in the multilink bundle. This allows a small window of sequence numbers to be used at the receiver. The size of the window for both the downstream and the upstream is specified by the CMTS in a Multilink Descriptor message (MLD). This is shown below.

| Type Value | Version | Message Name | Message Descriptor |
|---|---|---|---|
| 31 | 4 | MLD | Multilink Descriptor |

The value of the sequence number increases by 1. When it exceeds 64K, the value wraps back to 0.

Session IDs

Having sequence numbers be unique per MAC DA allows a cable modem to limit the number of sequence numbers it needs to track. However, there could be issues when several receivers are monitoring the same wideband channel for data. By instituting a session ID (SID) for each cable modem, group of cable modems or even for each flow within traffic for a particular cable modem, it is possible for the cable modems to 'avoid' each other's traffic.

For example, assume a CMTS has 8 QAMs available, QAMs 1-8. There are two groups of users, each group comprised of users having the same type of cable modem. One group has cable modems that can monitor traffic on all 8 QAMs, and the other group has cable modems that can monitor traffic on only 4 of the QAMs, QAMs 1-4. This may be referred to as overlapping bonded channels, as both groups are using QAMS 1-4. The bonded channels may be transporting MPEG or multilink packets.

A session ID could be established for the cable modem group that can listen on all 8 QAMs and another for the cable modem group that can listen on only 4. This would allow the group that can only listen to 4 to ignore the data for the group that can listen to all 8 that is sent out on QAMs 1-4. The listening cable modems for a particular group of QAMs would 'hear' all data for all cable modems in the group, and then could analyze the packet for the MAC address of the intended cable modem.

Session IDs could also be used for each cable modem, allowing cable modems to listen only to the data intended for that particular cable modem. The other cable modems would not 'hear' that data, nor would the cable modems have to analyze the headers to determine the MAC address. In another embodiment, the session ID could be used to separate sequences associated with flows within the cable modem. For example, there could be several different data streams going to one cable modem. Each stream would have a separate session ID; this would allow the cable modem to have Session 1, sequence number 1-8, Session 2, sequence numbers 1-9, etc.

Quality of Service

When several cable modems are sharing a connection, whether in the above scenario where some are listening on 4 QAMs and some on 8 or not, providing high enough bandwidth to each party to meet quality of service concerns becomes an issue. For example, using the scenario above, assume that each QAM has a capacity of 40 megabits per second (Mbps). The first group, listening to 4 QAMs, would have access to 160 Mbps. The second group would have twice that at 320 Mbps. However, there is physically only 320 Mbps available. The allocation of bandwidth between them would have to be handled in such a manner to allow each group and user's quality of service to be maintained.

The CMTS of FIGS. 3 or 4 may use hierarchical queuing function (HQF) in which allocation of available bandwidth is performed using a hierarchy based upon the customer, the flow or the QAM used. For example, based upon the above scenario, the hierarchical scheduling function 246 of FIG. 4 may preferentially use QAMs 5-8 for the second group first, mitigating loads on the shared QAMs 1-4.

In addition, a shortest queue function (SQF) could be employed, such as SQF 248 of FIG. 4. A shortest queue function takes a packet as it comes in and moves it to the shortest queue. The combination of the HQF and the SQF may result in the packet being rate shaped, queued and allocated to a particular subset of QAMs, and then allocated to the specific QAM having the shortest queue being selected from that subset.

Current equipment may already have HQFs available. By separating the two functions into two components, it is convenient to add the SQF functionality to the existing HQF functionality. There is no need for a large, complicated, scheduling function. The use of this combined queuing allows the CMTS to account for both over and under utilization of the QAMs to maintain quality of service. The queuing function may be used both for MPEG transport streams and for packet bonded transport streams.

In this manner, the downstream wideband receiving hardware has a protocol by which it can reconstruct the data transmitted across the wideband channel. This will generally be done by the wideband CMTS, which may be a new device specifically able to perform this type of function, or a traditional CMTS that is upgraded with operating software that allows it to perform these functions. In the latter case, the invention may be embodied in an article of computer-readable media that contains instructions that, when executed, cause the device to perform the methods of the invention, where the computer is the CMTS.

Thus, although there has been described to this point a particular embodiment for a method and apparatus to provide a wideband downstream protocol, it is not intended that such specific references be considered as limitations upon the scope of this invention except in-so-far as set forth in the following claims.

What is claimed is:

1. A method of packet bonding, the method comprising:
   receiving data traffic over a first network at a Cable Modem Termination System (CMTS);
   extracting a plurality of physical layer packets from the data traffic using the CMTS, the physical layer packets to be transmitted to a same cable modem in a second cable network, wherein the physical layer packets are part of a same bonded channel feeding data to a same physical destination address;
   attaching multilink headers to the physical layer packets;
   assigning a first one of the physical layer packets for transport over a first available Quadrature Amplitude Modulation (QAM) channel in the second cable network and a second one of the physical layer packets for transport over a second available QAM channel in the second cable network, wherein the physical layer packets are assigned to be distributed intact over different available QAM channels using the CMTS;
   wherein assigning the first physical layer packet for transport over the first available QAM channel further includes:
      selecting an initial packet/QAM association for the first physical layer packet using a Hierarchical Queuing Function (HQF) component of the CMTS; and
      selecting a final packet/QAM association using a Shortest Queue Function (SQF) component of the CMTS and the initial packet/QAM association, wherein said assigning the first physical layer packet is based on the final packet/QAM association; and
   transmitting the first physical layer packet over the first available QAM channel and the second physical layer packet over the second available QAM channel using the CMTS, wherein the first physical layer packet is transmitted according to the final packet/QAM association.

2. The method of claim 1, further comprising sending from the CMTS to the cable modem a control packet that corresponds to at least one of the physical layer packets, wherein a control header of the control packet includes a type field used to indicate whether the corresponding physical layer packet is an upstream communication or a downstream communication.

3. The method of claim 2, wherein the control header includes a length field used to indicate whether the corresponding physical layer packet is a multilink type or a transport stream type.

4. The method of claim 3, wherein if the length field indicates the multilink type, then the corresponding physical layer packet includes an entire representation of a packet communication received over the first network.

5. The method of claim 2, wherein the control header includes a length field set to indicate whether sequence numbers of the corresponding physical layer packet were locally or remotely inserted.

6. The method of claim 1, further comprising:
   identifying QAM channels usable for sending wideband communications;
   identifying a subset of the QAM channels according to a customer identification associated with the received data traffic; and
   selecting the first and second available QAM channels from the subset when the first and second available QAM channels each have a shorter queue than remaining QAM channels within the subset.

7. The method of claim 1, further comprising sending from the CMTS to the cable modem a control packet to correspond to at least one of the physical layer packets, wherein the control packet includes a control header comprising:
   a type subfield to store a first bit value if the corresponding physical layer packet is a downstream transmission and a second different bit value if the corresponding physical layer packet is an upstream transmission;
   a length subfield to indicate, according to the number of bits stored in the length subfield, whether the corresponding physical packet contains sequence numbers; and
   a value subfield.

8. The method of claim 1, wherein the multilink headers have a sequence number field and a downstream identifier field, and wherein a first one of the multilink headers has a sequence number value N and a second one of the multilink headers has a sequence number value N+1, and wherein the downstream identifier fields of the multilink headers have identical values;
   wherein the CMTS is located remotely with respect to an origination endpoint that originally encoded the physical layer packets and transmitted the same over the first network, and wherein the sequence numbers and the downstream identifiers are midpoint-inserted by the remotely located CMTS some time after transmission from the encoding origination endpoint; and
   wherein the sequence number values N and N+1 are repeated by multilink headers for other physical layer packets of another bonded channel that utilizes at least one of the QAM channels of the bonded channel, and wherein the overlapping bonded channels carry different downstream identifier field values to allow a cable modem monitoring the QAM channels to distinguish independent sequencing contexts on a per flow basis for each bonded channel.

9. The method of claim 8, further comprising using the cable modem to order the received first and second physical layer packets independently of an order of arrival, wherein the cable modem identifies a common sequencing context for the first and second physical layer packets separate from a different sequencing context of other received physical layer packets having a same Media Access Control (MAC) address as the first and second physical layer packets by analyzing the downstream identifier fields of such packets and then orders the received first and second physical layer packets according to the sequence number values N and N+1.

10. The method of claim 8, further comprising using the cable modem to order the received first and second physical layer packets independently of an order of arrival, wherein the cable modem identifies a common sequencing context for the first and second physical layer packets without analyzing MAC address fields included in the first and second physical layer packets.

11. The method of claim 8, wherein the downstream identifier field is separate from an MPEG PID field in the multilink headers.

12. The method of claim 8, wherein the sequence numbers vary per packet in a pre-negotiated pattern according to packet transmission order.

13. The method of claim 12, wherein the pre-negotiated pattern is monotonically ascending or descending.

14. The method of claim 1, wherein the combination of the initial selection using the HQF component and the final selection using the SQF component results in the first physical layer packet being rate shaped, queued, and allocated to a particular subset of QAMs of the CMTS, and then allocated to a specific QAM of the subset having the shortest queue being selected from that subset.

15. An article of manufacture including a memory device having instructions stored thereon that, in response to execution by a computing device, cause the computing device to perform operations comprising:
   extracting a plurality of physical layer packets from received data traffic, the physical layer packets to be transmitted to a same cable modem in a cable network, wherein the physical layer packets are part of a same bonded channel feeding data to a same physical destination address;
   assigning a first one of the physical layer packets for transport over a first available Quadrature Amplitude Modulation (QAM) channel in the cable network and a second one of the physical layer packets for transport over a second available QAM channel in the cable network, wherein the physical layer packets are assigned to be distributed intact over different available QAM channels;
   wherein assigning the first one of the physical layer packets for transport over the first available QAM channel further includes:
      selecting an initial packet/QAM association for the first one of the physical layer packets using a Hierarchical Queuing Function (HQF) component; and
      selecting a final packet/QAM association using a Shortest Queue Function (SQF) component and the initial packet/QAM association, wherein said assigning the first one of the physical layer packets is based on the final packet/QAM association;
   attaching multilink headers to the first and second ones of the physical layer packets; and
   transmitting the first one of the physical layer packets over the first available QAM channel and the second one of the physical layer packets over the second available QAM channel, wherein the first one of the physical layer packets is transmitted according to the final packet/QAM association.

16. The article of manufacture of claim 15, wherein the combination of the initial selection using the HQF component and the final selection using the SQF component result in the first physical layer packet being rate shaped, queued, and allocated to a particular subset of QAMs of the CMTS, and then allocated to a specific QAM of the subset having the shortest queue being selected from that subset.

17. The article of manufacture of claim 15, wherein the multilink headers have a sequence number field and a downstream identifier field, and wherein a first multilink header has a first particular sequence number value and a second multilink header has a second different particular sequence number value, and wherein the downstream identifier fields of the multilink headers have identical values;
   wherein the sequence numbers and the downstream identifiers are midpoint-inserted some time after transmission from an origination source that originally encoded the physical layer packets; and
   wherein the first and second particular sequence number values are repeated by multilink headers for other physical layer packets of another bonded channel that utilizes at least one of the QAM channels of the bonded channel, and wherein the overlapping bonded channels carry different downstream identifier field values to allow a cable modem monitoring the QAM channels to distinguish independent sequencing contexts on a per flow basis for each bonded channel despite the repeated sequence number values.

18. The article of manufacture of claim 15, wherein the operations further comprise sending from a Cable Modem Termination System (CMTS) to the cable modem a control packet that corresponds to at least one of the physical layer packets, wherein a control header of the control packet includes a type field used to indicate whether the corresponding physical layer packet is an upstream communication or a downstream communication.

19. The article of manufacture of claim 18, wherein the control header includes a length field used to indicate whether the corresponding physical layer packet is a multilink type or a transport stream type.

20. The article of manufacture of claim 19, wherein if the length field indicates the multilink type, then the corresponding physical layer packet includes an entire representation of a packet communication received over the first network.

21. The article of manufacture of claim 18, wherein the control header includes a length field set to indicate whether sequence numbers of the corresponding physical layer packet were locally or remotely inserted.

22. The article of manufacture of claim 15, wherein the operations further comprise:
   identifying QAM channels usable for sending wideband communications;
   identifying a subset of the QAM channels according to a customer identification associated with the received data traffic; and
   selecting the first and second available QAM channels from the subset when the first and second available QAM channels each have a shorter queue than remaining QAM channels within the subset.

23. The article of manufacture of claim 15, wherein the operations further comprise sending from a Cable Modem Termination System (CMTS) to the cable modem a control packet to correspond to at least one of the physical layer packets, wherein the control packet includes a control header comprising:
   a type subfield to store a first bit value if the corresponding physical layer packet is a downstream transmission and a second different bit value if the corresponding physical layer packet is an upstream transmission;
   a length subfield to indicate, according to the number of bits stored in the length subfield, whether the corresponding physical packet contains sequence numbers; and
   a value subfield.

\* \* \* \* \*